(12) United States Patent
Tabuchi

(10) Patent No.: US 8,080,342 B2
(45) Date of Patent: Dec. 20, 2011

(54) FUEL CELL SYSTEM

(75) Inventor: Yuichiro Tabuchi, State College, PA (US)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1176 days.

(21) Appl. No.: 11/815,120

(22) PCT Filed: Mar. 7, 2006

(86) PCT No.: PCT/IB2006/300492
§ 371 (c)(1),
(2), (4) Date: Jul. 31, 2007

(87) PCT Pub. No.: WO2006/095242
PCT Pub. Date: Sep. 14, 2006

(65) Prior Publication Data
US 2008/0131741 A1    Jun. 5, 2008

(30) Foreign Application Priority Data
Mar. 7, 2005    (JP) .................................. 2005-062218

(51) Int. Cl.
*H01M 8/04*    (2006.01)

(52) U.S. Cl. .......................... 429/413; 429/432; 429/450
(58) Field of Classification Search .................... None
See application file for complete search history.

(56) References Cited

U.S. PATENT DOCUMENTS

| | | |
|---|---|---|
| 2003/0031909 A1 | 2/2003 | Gascoyne et al. |
| 2004/0151956 A1 | 8/2004 | Orihashi et al. |

FOREIGN PATENT DOCUMENTS

| | | |
|---|---|---|
| JP | 2000-251913 | 9/2000 |
| JP | 2000-357531 | 12/2000 |
| JP | 2002-141086 | 5/2002 |
| JP | 2002-313396 | 10/2002 |
| JP | 2003-086220 | 3/2003 |
| JP | 2004-127915 | 4/2004 |
| WO | 02/082573 A1 | 10/2002 |
| WO | 03/098769 A2 | 11/2003 |

*Primary Examiner* — Jonathan Crepeau
(74) *Attorney, Agent, or Firm* — Young Basile

(57) ABSTRACT

A fuel cell system determines a water blockage or a dry state of the system using voltage sensors that determine anode and cathode voltages of single fuel cells as well as a total voltage for the fuel cell system. The system also compensates for water blockages or dry states by adjusting supplies of fuel and oxidation gases to the system.

23 Claims, 3 Drawing Sheets

FUEL CELL SYSTEM

CROSS-REFERENCE TO RELATED APPLICATIONS

The present application claims priority under 35 U.S.C. §119 of Japanese Application No. 2005-062218, filed on Mar. 7, 2005, the entire content of which is expressly incorporated by reference herein.

FIELD

The present invention pertains to a fuel cell system having a fuel cell stack where a plurality of fuel cells are stacked to generate electricity by receiving a supply of fuel gas and oxidant gas, respectfully, by a fuel electrode (anode) and oxidation electrode (cathode).

BACKGROUND

One example of a conventionally known fuel cell system (see Japanese Laid Open Patent Publication 2002-313396) provides a voltage detection device in at least one location in the vicinity of the hydrogen exit or in the vicinity of the air exit of the fuel cell that has the greatest tendency for reduction in cell voltage due to water blockage, and detects water blockage in the fuel cell by determining whether the cell voltage detected by the voltage detection device is lower than a predetermined voltage.

SUMMARY

Conventional fuel cell systems determined that decreases in voltage were all caused by water blockage.

Due to this, decreases in voltage caused by something other than water blockage were determined to be due to water blockage.

Therefore, a purpose of the present invention is to properly detect the cause of decreases in voltage.

According to the fuel cell systems and methods that pertain to the present invention causes of changes in voltage can be detected.

DETAILED DESCRIPTION

A description of the composition of the fuel cell system comprising the embodiments of the present invention is given below, with reference to drawings.

Composition of the Fuel Cell System

Figure 1:
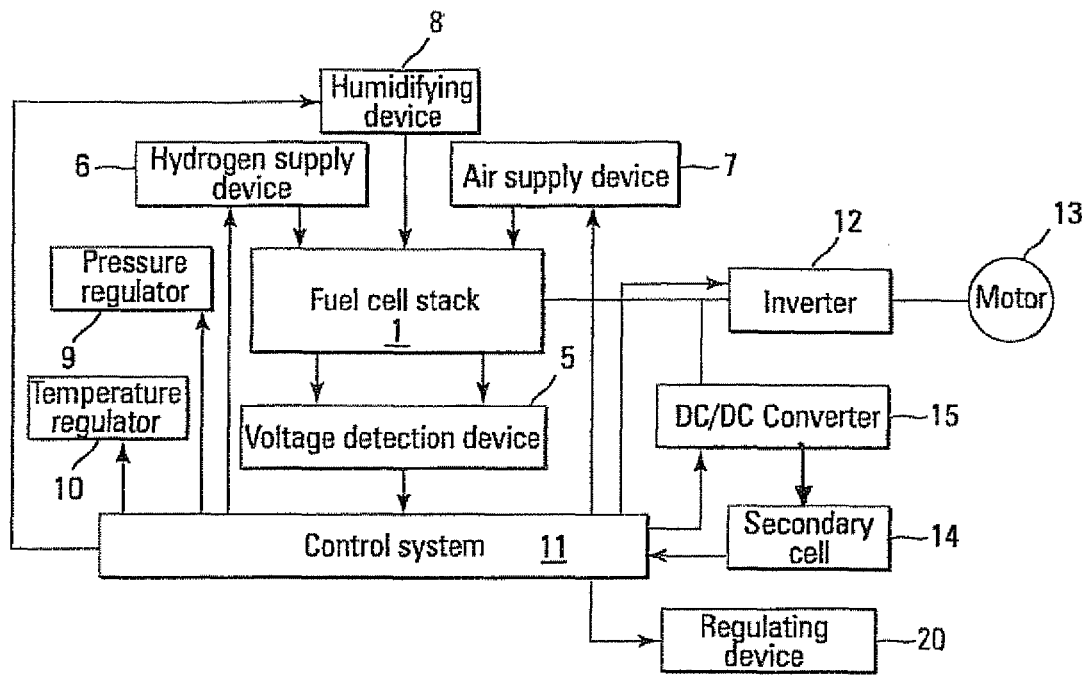
FIG. 1 is a block diagram showing the composition of the fuel cell system comprising a first embodiment of the present invention.

The fuel cell system of embodiments of the present invention is mounted in a vehicle and comprises, as shown in FIG. 1, fuel cell stack 1 where a plurality of fuel cells are stacked to generate electricity by receiving a supply of fuel gas and oxidant gas, respectfully, by a fuel electrode (anode) and oxidation electrode (cathode). Moreover, the fuel cell in this embodiment is composed of a proton-exchange membrane fuel cell holding a solid electrolyte membrane between a fuel electrode and oxidant electrode, and the electro-chemical reactions occurring in the fuel electrode and oxidant electrode as well as the electro-chemical reaction encompassing the entire fuel cell stack 1 are according to the formulae (1)-(3) shown below.

Chemical 1

$$\text{Fuel Electrode } H_2 \rightarrow 2H^+ + 2e^- \tag{1}$$

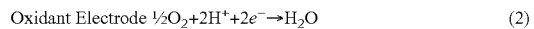

$$\text{Oxidant Electrode } \tfrac{1}{2}O_2 + 2H^+ + 2e^- \rightarrow H_2O \tag{2}$$

$$\text{Overall } H_2 + \tfrac{1}{2}O_2 \rightarrow H_2O \tag{3}$$

Figure 2:
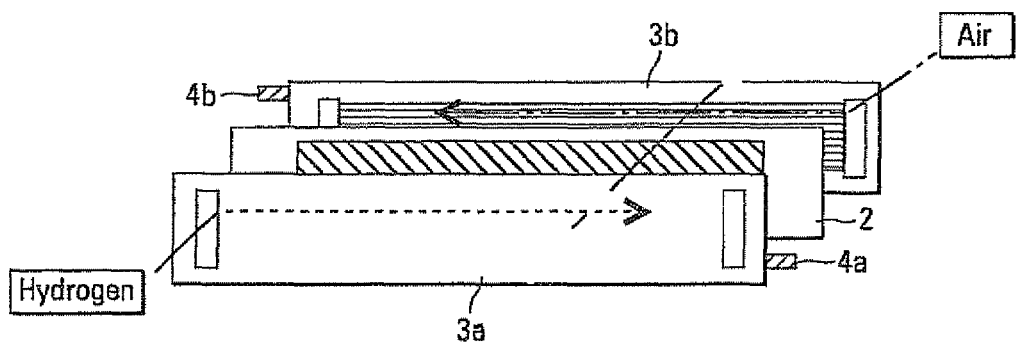
FIG. 2 is a schematic diagram showing the composition of the fuel cell comprising the first embodiment of the present invention.

Fuel cell stack 1, as shown in FIG. 2, interposes fuel cell 2 and comprises cell voltage measuring terminals 4a, 4b at the gas exit portions of separators 3a, 3b that supply hydrogen and air, respectfully, to the fuel electrode and oxidant electrode. Cell voltage measuring terminals 4a, 4b are connected to voltage detection device 5, shown in FIG. 1. Voltage detection device 5 (a first voltage sensor and second voltage sensor) detects the hydrogen exit side voltage of fuel cell 2, the air exit side voltage, cell in-plane electric potential (the difference between the hydrogen exit side voltage and the air exit side voltage) and the total voltage of fuel cell stack 1 via cell voltage measuring terminals 4a, 4b. Cell voltage can be detected for each individual cell or for each plurality of cells.

Hydrogen supply device 6 (for example, a high-pressure hydrogen tank) and air supply device 7 (for example, a compressor) in this fuel cell system shown in FIG. 1, supply hydrogen and air, respectively, to fuel cell stack 1 while fuel cell stack 1 is kept in a humid state suitable for generating electricity by humidifying device 8 (for example, a device that jet-sprays water into gas). Further, the pressure of the gas supplied to fuel cell stack 1 by hydrogen supply device 6 and air supply device 7 is regulated by pressure regulator 9 (for example, a pressure regulator valve), the amount of flow is regulated by flow volume regulating device 20 (for example a variable valve or a compressor), and the operating temperature of fuel cell stack 1 is controlled by temperature regulator 10 (for example, a cooling channel equipped with a radiator or a circulation pump).

Further, control system 11 in this fuel cell system controls the overall operation of the fuel cell system. More specifically, control system 11 controls hydrogen supply device 6, air supply device 7, humidifying device 8, pressure regulator 9, and temperature regulator 10, based on the result detected by voltage detection device 5. Control system 11 additionally controls the drive current of motor 13 that drives the vehicle, by controlling inverter 12 that converts direct current generated by fuel cell stack 1 into alternating current. Control system 11 also controls the operation of DC/DC converter 15 in order to control the charging and discharging of secondary cell 14 mounted in the vehicle.

Moreover, the fuel cell system having the composition described above, accurately determines in which side of fuel cell 2, the fuel electrode side or the oxidation electrode side, water blockage has occurred, by implementing the drive control process indicated hereinafter by control system 11. Water blockage is a phenomenon that occurs when a proton-exchange membrane, for example, is in an overly-humidified state or when the channel(s) provided on the separator(s) and through which gas flows, is blocked with water. An explanation is provided below, with reference to the flowchart shown in FIG. 3, of the operation of control system 11 when implementing this drive control process.

Figure 4:
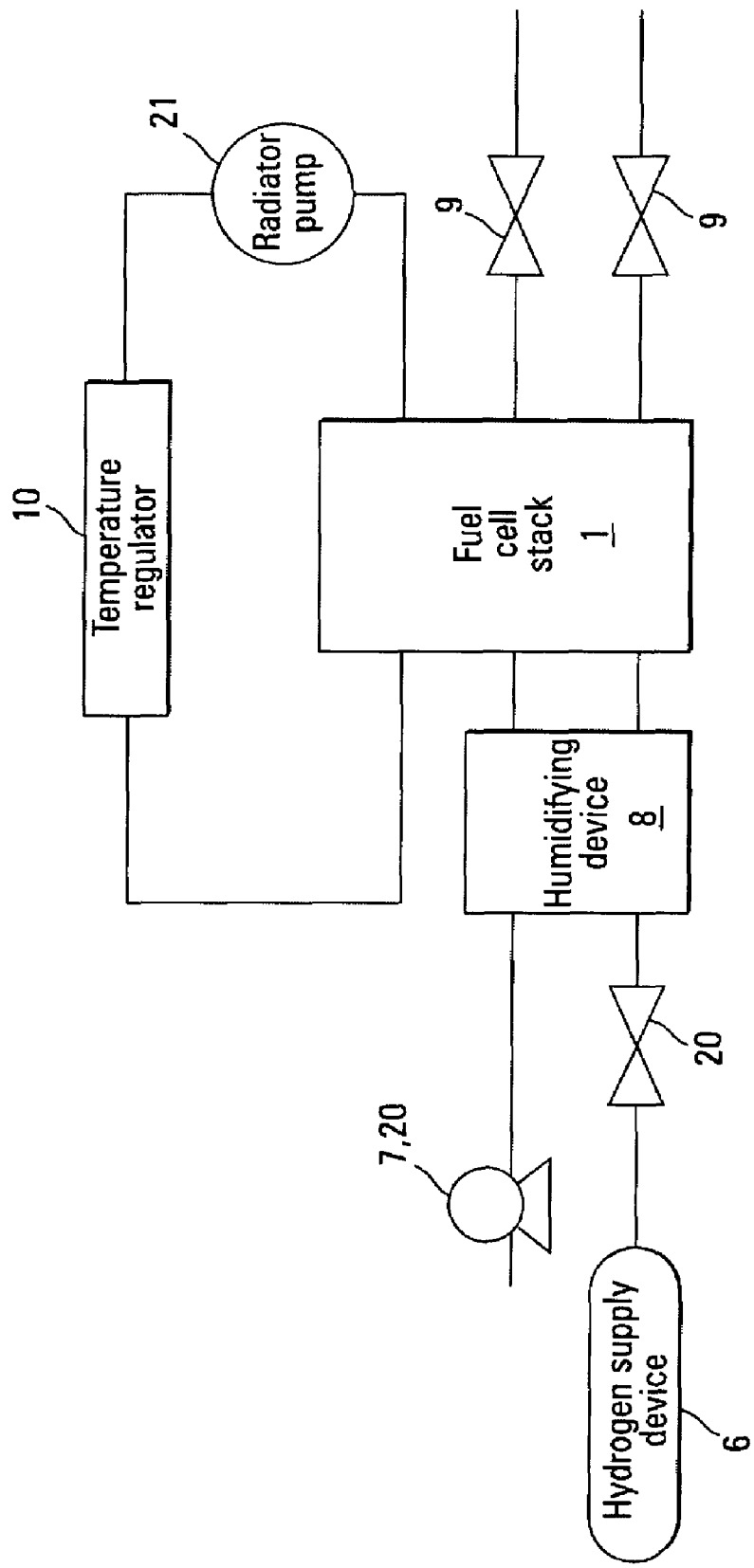
FIG. 4 is a block diagram showing the composition of the fuel cell system according to another embodiment of the present invention.

Referring now to FIG. 4, another embodiment of the fuel cell system is shown. In FIG. 4, hydrogen supply device 6, for example, a high-pressure hydrogen tank, and air supply device 7, for example, a compressor, in the fuel cell system, supply hydrogen and air, respectively, to fuel cell stack 1 while fuel cell stack 1 is kept in a humid state suitable for generating electricity by humidifying device 8, for example a device that jet-sprays water into gas. Further, the pressure of the gas supplied to fuel cell stack 1 by hydrogen supply device 6 and air supply device 7 is regulated by pressure regulators 9, for example, pressure regulator valves; the amount of flow is regulated by flow volume regulating device 20, for example, a variable valve or a compressor; and the operating temperature of fuel cell stack 1 is controlled by temperature regulator 10, for example, a cooling channel equipped with a radiator or a circulation pump 21.

Drive Control Process

Figure 3:
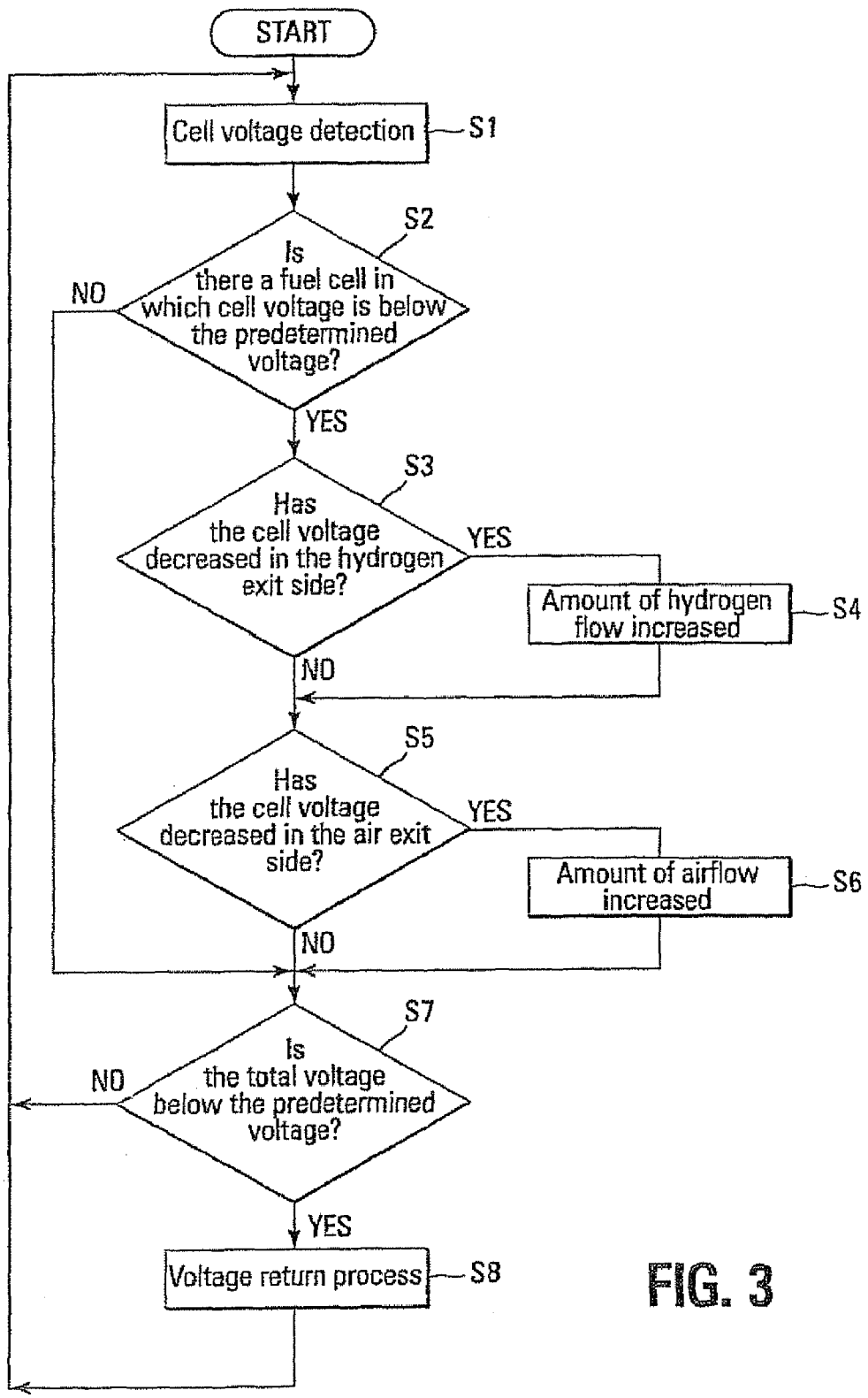
FIG. 3 is a flowchart showing the drive control process flow comprising the first embodiment of the present invention.

The flowchart shown in FIG. 3 begins accordingly with initiating the generation of electricity by fuel cell stack 1 according to the hydrogen flow amount, air flow amount, current, operating pressure, and operating temperature that are set based on the information of the accelerator opening or the like, and the drive control process advances to the process in step S1.

At the process in step S1, control system 11 detects the output voltage (cell voltage) of each of fuel cell 2 comprising fuel cell stack 1 by means of voltage detection device 5. In this manner, the process in step S1 is completed, and the control process advances to the process in step S2.

At the process in step S2, control system 11 determines whether there is a fuel cell 2 in which the cell voltage is below a predetermined voltage (the voltage of the cell in which water blockage occurs is set according to known or observed properties of the system). If the result of the determination is that there is not a fuel cell 2 in which the cell voltage is below a predetermined voltage, then the control process returns to the process in step S1; however, if there is a fuel cell 2 in which the cell voltage is below a predetermined voltage, control system 11 advances the control process to the process in step S3.

At the process in step S3, control system 11 detects the hydrogen exit side voltage of the fuel cell 2 in which the cell voltage is below the predetermined voltage by means of voltage detection device 5 and determines whether the hydrogen exit side voltage is below a predetermined voltage. If the result of the determination is that the hydrogen exit side voltage is not below a predetermined voltage, control system 11 advances the control process to the process in step S5. Meanwhile, if the hydrogen exit side voltage is below a predetermined voltage, control system 11 determines that water blockage has occurred at the fuel electrode side and after controlling the hydrogen exit side voltage to be above a predetermined voltage by increasing the hydrogen flow amount (for example, by expanding the opening of the variable valve 20) by controlling hydrogen supply device 6 in the process in step S4, the control process advances to the process in step S5. Moreover, control system 11 detects the cell in-plane electric potential and if the electric potential of the hydrogen side exit of fuel cell 2 is lower than the electric potential of the air side exit, then a determination may also be made that water blockage has occurred at the fuel electrode side.

At the process in step S5, control system 11 detects the air exit side voltage of the fuel cell 2 in which the cell voltage is below a predetermined voltage by means of voltage detection device 5 and determines whether the air exit side voltage is below a predetermined voltage. Further, if the result of the determination is that the air exit side voltage is not below a predetermined voltage, control system 11 advances the control process to the process in step S7. Meanwhile, if the air exit side voltage is below a predetermined voltage, control system 11 determines that water blockage has occurred at the oxidation electrode side, and after controlling the air exit side voltage to be above a predetermined voltage by increasing the air flow amount (for example, by increasing the number of rotations of the compressor) by controlling air supply device 7 in the process in step S6, the control process advances to the process in step S7.

Moreover, control system 11 detects the cell in-plane electric potential, and if the electric potential of the air side exit is lower than the electric potential of the hydrogen side exit, then a determination may also be made that water blockage has occurred at the oxidation electrode side. Further, for the processes in steps S4 and S5, if a decreasing voltage that pulsates across the threshold of a predetermined voltage (the output that should be generated when in a steady state (voltage)) is detected, control system 11 preferably stabilizes the cell voltage by either lowering the operating pressure (to the atmospheric pressure) of fuel cell stack 1 by controlling pressure regulator 9 (for example, by closing the opening of the pressure regulator valve), or by raising the operating temperature of fuel cell stack 1 by controlling temperature regulator 10 (for example, by stopping the rotation of the circulating pump). A steady state is a state in which the electric current value is steady and the temperature distribution calculated from the amount of colling water flow is steady, or, in other words, when the target temperature has been reached.

At the process in step S7, control system 11 determines whether the total voltage of fuel cell stack 1 has fallen below a predetermined voltage (the voltage for when the proton-exchange membrane is in a dry state is set according to known or observed properties of the system) with the passage of time. Further, if the result of the determination is that the total voltage has not fallen below a predetermined voltage, control system 11 returns the control process to the process in step S1. Meanwhile, if the total voltage has fallen below a predetermined voltage, control system 11 determines that the solid electrolyte membrane that comprises fuel cell 2 is in a dry state, and advances the control process to the process in step S8.

At the process in step S8, control system 11 performs control so that the total voltage rises above a predetermined voltage by: lowering the air flow amount by controlling air supply device 7 (for example, by lowering the number of rotations of the compressor); raising the relative humidity at the gas entry side of fuel cell 2 by controlling humidifying device 8 (for example, by increasing the amount of water that is jet-sprayed); lowering the operating temperature of fuel cell stack 1 by controlling temperature regulator 10 (for example, by increasing the number of rotations of the circulation pump); or raising the operating pressure of fuel cell stack 1 by controlling pressure regulator 9 (for example, by closing the opening of the pressure regulator valve). Therefore, in this manner, the process in step S8 is completed, and the control process returns to the process in step S1.

For purposes of the present embodiment, lowering the predetermined voltage means lowering it when the current is constant. In other words, the voltage detected is lower than the target voltage in relation to the current.

As is evident from the explanation provided above, the fuel cell system embodiments of the present invention have the ability to accurately determine in which side of fuel cell 2, the fuel electrode (anode) side or the oxidation electrode (cathode) side, water blockage occurs, because cell voltage measuring terminals 4a, 4b are provided at the hydrogen exit and air exit of each fuel cell, and voltage detection device 5 detects the hydrogen exit side voltage of fuel cell 2, the air exit side voltage, the cell in-plane electric potential, and the total voltage of fuel cell stack 1 by means of cell voltage measuring terminals 4a and 4b.

Further, the fuel cell system comprising the embodiments of the present invention has the ability to demonstrate stable output performance by keeping deterioration of the sold electrolyte membrane to a minimum by using the result detected to quickly execute return processing because control system 11 detects water blockage in each fuel cell, or a dry state of the solid electrolyte membrane comprising the fuel cell, based on the result detected by voltage detection device 5, so that the reciprocating dry state and water blockage can be detected.

Further, the fuel cell system embodiments of the present invention have the ability to rapidly and accurately determine in which side of fuel cell 2, the fuel electrode side or the oxidation electrode side, water blockage occurs because, if the cell voltage is below a predetermined voltage, control system 11 detects water blockage of either the fuel electrode side or the oxidation electrode side by determining in which location, the hydrogen exit or the air exit, cell voltage has fallen below a predetermined voltage.

Further, the fuel cell system embodiments of the present invention have the ability to rapidly and accurately determine in which side of fuel cell 2, the fuel electrode side or the oxidation electrode side, water blockage occurs because, if the cell voltage is below a predetermined voltage, control system 11 detects the in-plane electrical potential of the fuel cell, and if the electric potential of the hydrogen exit side is lower than the electric potential of the air exit side, water blockage is determined to be on the fuel electrode side, and if the electric potential of the air exit side is lower than the electric potential of the hydrogen exit side, water blockage is determined to be on the oxidation electrode side.

Further, the fuel cell system embodiments of the present invention have the ability to rapidly and accurately return and stabilize cell voltage because control system 11 controls cell voltage of the fuel cell to be above a predetermined voltage by increasing the amount of gas flow supplied to the electrode at which water blockage occurs.

Further, the fuel cell system embodiments of the present invention have the ability to rapidly and accurately return and stabilize cell voltage because control system 11 increases the output voltage of the fuel cell by lowering the operating pressure or raising the operating temperature of the fuel cell when there is a fuel cell in which the cell voltage pulsates across the threshold of a predetermined voltage.

Further, the fuel cell system embodiments of the present invention have the ability to simultaneously detect a dry state of the solid electrolyte membrane together with water blockage because control system 11 determines that the solid electrolyte membrane that comprises the fuel cell is in a dry state when the output voltage of fuel cell stack 1 reduces with the passage of time.

Further, the fuel cell system embodiments of the present invention have the ability to eliminate a dry state of the solid electrolyte membrane at the same time as water blockage because control system 11 increases the output voltage of the fuel cell in which the solid electrolyte membrane is in a dry state by lowering the operating temperature of the fuel cell, reducing the gas supplied to at least one side of the fuel electrode side or the oxidation electrode side of the fuel cell, raising the operating pressure of the fuel cell, or raising the relative humidity of the air electrode side of the fuel cell.

Further, for the fuel cell system embodiments of the present invention, control system 11 makes the determination as to whether there is a water blockage after it determines whether there is a dry state, so the voltage for an ordinary dry state is higher than the voltage for water blockage, thus allowing for an efficient determination. In addition, giving precedence to determinations pertaining to the failure of the fuel cell itself, which is a dry state, can prolong the life of the fuel cell.

Further, the fuel cell system embodiments of the present invention provide an understanding of the phenomenon whereby the flow of gas gets obstructed, the distribution of the gas becomes disturbed, the channel gets blocked with water, and the voltage for the cell alone falls when water blockage is determined using the cell voltage. It also provides an accurate understanding of the fall in voltage due to a disturbance of temperature distribution when determining a dry state using the total voltage.

Further, the fuel cell system embodiments of the present invention can also detect when water gets blocked inside of a porous body such as a gas dispersion layer. That is, even though sufficient gas has been supplied to the gas channel, the water blocked in the porous body prevents the dispersion of gas to the catalyst layer. Accordingly, water blockage takes place when the total voltage has fallen with the passage of time and when there is a decline in the voltage that pulsates across the threshold of a predetermined voltage.

An explanation was provided hereinabove of embodiments that apply the invention conceived by the inventors; however, the present invention is not limited to the description or drawings in any part of the disclosure of the present invention according to the embodiments. In other words, it is obvious that any other embodiment, form of implementation, or operating technology conceived by a person skilled in the art based on the above embodiments are all included within the scope of the present invention.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A fuel cell system, comprising:
    a plurality of stacked fuel cells, each provided with a membrane between separators of the fuel cells;
    a voltage detection device associated with each of the plurality of stacked fuel cells that detects a single cell voltage for one of the plurality of stacked fuel cells;
    a first voltage sensor that detects an anode side voltage and a cathode side voltage for each of the plurality of stacked fuel cells;
    a second voltage sensor that detects a total cell voltage for the plurality of stacked fuel cells; and
    a controller configured to determine water blockage when a value for the first voltage sensor is below a predetermined value and determines a dry state when a value for the second voltage sensor decreases with a passage of time.

2. The fuel cell system of claim 1, wherein the controller determines water blockage after determination of a dry state is performed.

3. The fuel cell system of claim 1, wherein the controller is configured to detect an in-plane electric potential of the fuel cell when the single cell voltage of the fuel cell is below a predetermined voltage; and wherein the controller is operable to determine the water blockage exists at an anode side when the electric potential at an anode exit side is lower than the electric potential at a cathode exit side, and to determine the water blockage exists at a cathode side when the electric potential at the cathode exit side is lower than the electric potential at the anode exit side.

4. The fuel cell system of claim 3, wherein the controller is configured to increase gas flow supplied to the cathode side or the anode side at which water blockage occurs.

5. The fuel cell system of claim 1, wherein the controller determines water blockage when the value for the second voltage sensor decreases with the passage of time, and an output voltage pulsates across a threshold of the predetermined voltage, which is the value of the first voltage sensor.

6. The fuel cell system of claim 5, wherein the controller raises an operating temperature of the fuel cell when water blockage is determined.

7. The fuel cell system of claim 5, wherein the controller lowers an operating pressure of the fuel cell when water blockage is determined.

8. The fuel cell system of claim 1, wherein the controller lowers an operating temperature of the fuel cell when a dry state is determined.

9. The fuel cell system of claim 1, wherein the controller decreases a supply of at least one of the gases supplied to the fuel cell when a dry state is determined.

10. The fuel cell system of claim 1, wherein the controller raises an operating pressure of the fuel cell when a dry state is determined.

11. The fuel cell system of claim 1, wherein the controller raises a relative humidity at a cathode side of the fuel cell when a dry state is determined.

12. A method of operating a fuel cell system, comprising:
sensing with a voltage detection device a single cell voltage for each of a plurality of stacked fuel cells provided with a membrane between separators of fuel cells in the fuel cell system;
sensing with a first sensor an anode side voltage and a cathode side voltage for each of the plurality of stacked fuel cells;
sensing with a second sensor a total cell voltage for the plurality of stacked fuel cells;
determining with a controller that a water blockage exists when the single cell voltage is below a predetermined value; and
determining with the controller that a dry state exists when the total cell voltage decreases with a passage of time.

13. The method of claim 12, and further comprising:
determining at which of an anode and a cathode of the one of the plurality of stacked fuel cells a water blockage exists.

14. The method of claim 13, further comprising:
increasing gas flow supplied to an electrode including the anode or the cathode at which the water blockage exists.

15. The method of claim 13, wherein determining where a water blockage exists further comprises:
determining a water blockage exists at the anode when the electric potential of an anode exit side is lower than the electric potential of a cathode exit side; and
determining a water blockage exists at the cathode when the electric potential of the cathode exit side is lower than the electric potential of the anode exit side.

16. The method of claim 15, and further comprising:
increasing gas flow supplied to an electrode at which the water blockage exists.

17. The method of claim 12, wherein determining that a water blockage exists further comprises:
determining when a value for the second sensor decreases with the passage of time, and an output voltage pulsates across a threshold of a predetermined voltage, which is a value of the first sensor.

18. The method of claim 17, and further comprising raising an operating temperature of the fuel cell when water blockage is determined.

19. The method of claim 17, and further comprising lowering an operating pressure of the fuel cell when water blockage is determined.

20. The method of claim 12, and further comprising lowering an operating temperature of the fuel cell when a dry state is determined.

21. The method of claim 12, and further comprising decreasing a supply of at least one of an oxidation gas and a fuel gas supplied to the fuel cell when a dry state is determined.

22. The method of claim 12, and further comprising raising an operating pressure of the fuel cell when a dry state is determined.

23. The method of claim 12, and further comprising raising a relative humidity at a cathode of the fuel cell when a dry state is determined.

* * * * *